United States Patent
Draper et al.

(10) Patent No.: US 8,528,767 B2
(45) Date of Patent: Sep. 10, 2013

(54) HYDRAULIC RESERVOIR PRESSURE RELIEF MECHANISM

(75) Inventors: Don R. Draper, Chanhassen, MN (US); Christopher T. Arneson, Elko, MN (US)

(73) Assignee: Eaton Corporation, Cleveland, OH (US)

( * ) Notice: Subject to any disclaimer, the term of this patent is extended or adjusted under 35 U.S.C. 154(b) by 1021 days.

(21) Appl. No.: 12/349,200

(22) Filed: Jan. 6, 2009

(65) Prior Publication Data

US 2010/0170240 A1 Jul. 8, 2010

(51) Int. Cl.
B65D 51/16 (2006.01)

(52) U.S. Cl.
USPC .............. 220/203.23; 220/360; 220/328

(58) Field of Classification Search
USPC ........... 220/203.23, 203.01, 203.04, 203.09, 220/203.13, 203.19, 203.22, 203.29, 367.1, 220/373, 360, 328, 327; 215/270; 60/464; 29/428
See application file for complete search history.

(56) References Cited

U.S. PATENT DOCUMENTS

| | | | | | |
|---|---|---|---|---|---|
| 1,923,503 | A | * | 8/1933 | Raines | 220/203.04 |
| 2,006,319 | A | * | 6/1935 | Hueber | 137/496 |
| 2,776,070 | A | * | 1/1957 | Phillips | 220/203.11 |
| 3,918,606 | A | * | 11/1975 | Keller | 220/203.19 |
| 4,147,096 | A | * | 4/1979 | Caswell | 454/20 |
| 4,768,675 | A | * | 9/1988 | Coleman | 220/203.24 |
| 5,092,483 | A | * | 3/1992 | McKelvy | 220/327 |
| 5,191,991 | A | * | 3/1993 | Jackson | 220/203.08 |
| 5,316,167 | A | * | 5/1994 | Kay | 220/328 |
| 5,425,466 | A | * | 6/1995 | Bambacigno | 220/203.09 |
| 5,460,285 | A | * | 10/1995 | Harding, Sr. | 220/203.1 |
| 5,511,575 | A | * | 4/1996 | Andenmatten et al. | 137/43 |
| 5,692,632 | A | * | 12/1997 | Hsieh et al. | 220/212 |
| 6,551,015 | B1 | * | 4/2003 | Khajavi et al. | 404/25 |
| 6,622,862 | B1 | * | 9/2003 | Corrado | 206/363 |

FOREIGN PATENT DOCUMENTS

| | | |
|---|---|---|
| FR | 1225287 A | 6/1960 |
| FR | 2558929 A1 | 8/1985 |
| JP | 54063216 A | 5/1979 |
| WO | WO-2005/047082 A2 | 5/2005 |

OTHER PUBLICATIONS

English abstract for JP-54063216.
English abstract FR-2558929.
ISR for PCT/US2010/020218.

* cited by examiner

Primary Examiner — Jacob K Ackun
Assistant Examiner — Jenine Pagan
(74) Attorney, Agent, or Firm — Rader, Fishman & Grauer PLLC

(57) ABSTRACT

An exemplary hydraulic reservoir includes a reservoir tank having an interior cavity for retaining a fluid and an aperture fluidly connecting the interior cavity to an exterior region of the reservoir. A cover selectively engages the reservoir tank, and is movable between an open position, wherein the fluid path through the aperture in the reservoir tank is at least partially open, and a closed position, wherein the fluid path through the aperture is substantially closed. The hydraulic reservoir further includes a pressure relief mechanism having at least one pressure responsive fastener for releasably connecting the cover to the reservoir tank. The at least one pressure responsive fastener includes a fastener fixed for concurrent movement with one of the cover and the reservoir tank, and a biasing member operably connecting the fastener to whichever of the cover and reservoir tank is not fixed for concurrent movement with the fastener.

8 Claims, 8 Drawing Sheets

HYDRAULIC RESERVOIR PRESSURE RELIEF MECHANISM

BACKGROUND

Hydraulic drive systems are known to help facilitate the conversion between mechanical energy (e.g., in the forming of rotating shafts) and hydraulic energy, typically in the form of pressure. One hydraulic drive system that is known for use with respect to vehicles is known by the trademarks Hydraulic Launch Assist™ or HLA® by the assignee of the present application. When a vehicle brakes, mechanical energy from the vehicle motion is captured by the hydraulic drive system and stored in a high pressure storage device. The hydraulic energy can be converted back into mechanical energy by releasing the pressurized fluid stored in the high pressure storage, which in turn can be used to accelerate the vehicle or power other devices.

DETAILED DESCRIPTION

Figure 1:
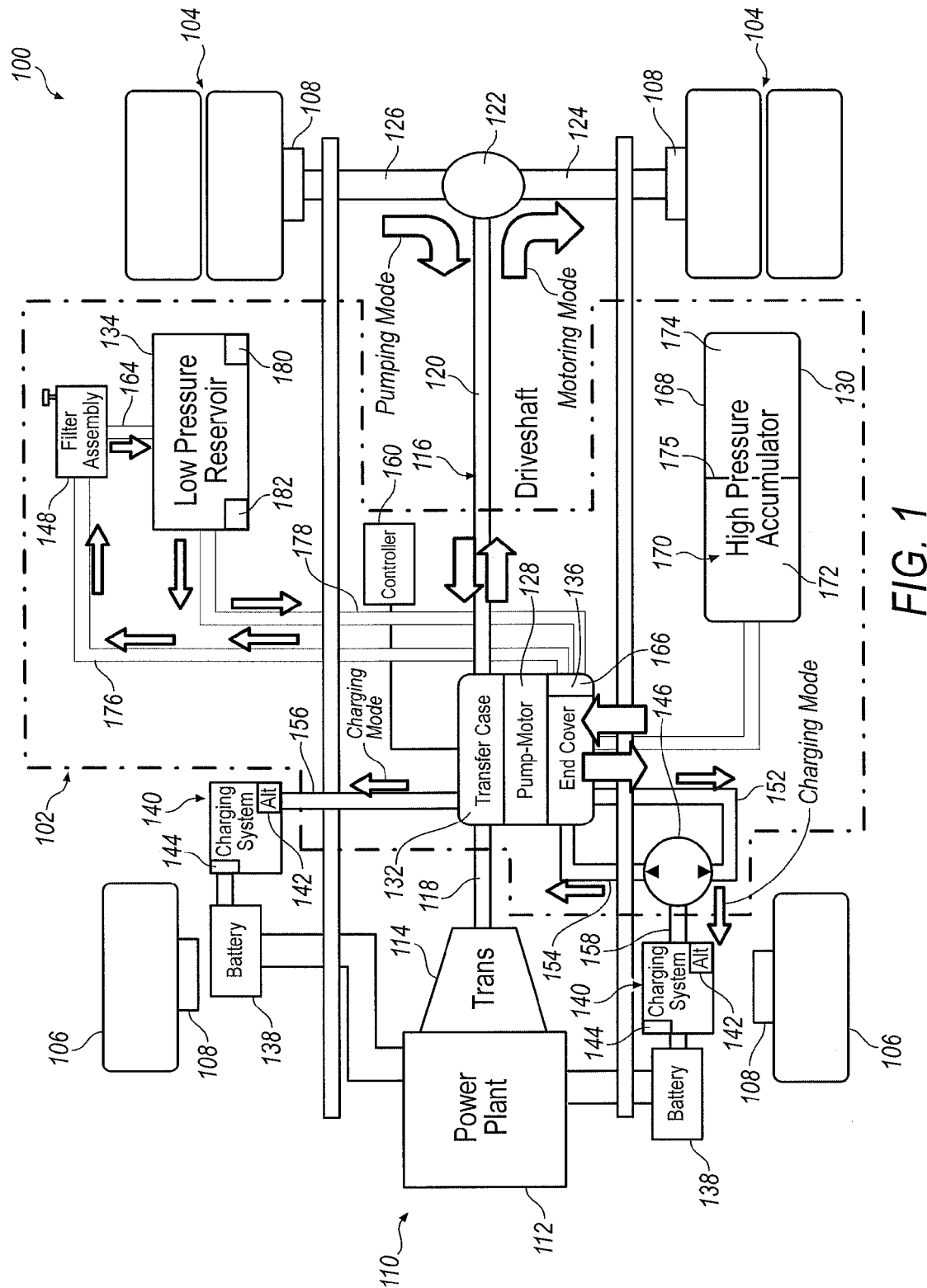
FIG. 1 is a schematic illustration of a vehicle employing an exemplary hydraulic drive/charging system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

To facilitate the discussion that follows, the leading digits of an introduced element number will generally correspond to the figure number where the element is first introduced. For example, motor vehicle 100 is first introduced in FIG. 1.

FIG. 1 schematically illustrates a motor vehicle 100 with an exemplary hydraulic drive/charging system 102, known by the trademarks Hydraulic Launch Assist™ or HLA® by the assignee of the present application when used with vehicle 100. Hydraulic drive/charging system 102 captures energy through pressurized hydraulic fluid and stores a portion of the vehicle's kinetic energy in the form of pressurized gas. The stored energy can be converted back into mechanical energy by hydraulic drive/charging system 102, which can be used to propel the vehicle or power other vehicle accessories. For example, the stored hydraulic energy may be used to power a vehicle charging system for at least partially charging a battery that supplies power to an electric motor, such as may be found in an electric or hybrid vehicle. This may in turn enable the vehicle to travel further distances between charges. Such an arrangement is discussed in more detail below.

Vehicle 100 has four rear drive wheels 104 and two front non-drive wheels 106. In other illustrative embodiments all wheels may be drive wheels. Moreover, there may be more or fewer wheels for vehicle 100. Operably associated with each of the wheels 104 and 106 may be a conventional type of wheel brakes 108. Wheel brakes 108 may be part of an overall electro-hydraulic brake (EHB) or air brake system, of a known type, and commercially available.

Vehicle 100 includes a vehicle drive system, generally designated 110. Vehicle drive system 110 may include a vehicle power plant 112, a transmission 114, and hydraulic drive/charging system 102. Transmission 114 is operatively connected to power plant 112 and transmits torque generated by power plant 112 to rear drive wheels 104. Transmission 114 also interacts with hydraulic drive/charging system 102, as discussed in greater detail below. The particular type of vehicle power plant 112 and transmission 114, and the construction details thereof, as well as the arrangement of vehicle drive system 110, may be varied in a variety of ways. For example, it will be understood that references to a "power plant" include any type of power source or other prime mover, including, but not limited to, an internal combustion engine, electric motor, or combination thereof. Finally, although hydraulic drive/charging system 102 is illustrated and described in connection with a vehicle drive system 110, it may be utilized advantageously with any sort of hydraulic drive/charging system of the type illustrated and described hereinafter, whether or not such system is part of a vehicle.

Extending rearwardly from the transmission 114 and also forming a portion of vehicle drive system 110 is a drive-line, generally designated 116. In the illustrated vehicle drive system 110, and by way of example only, drive-line 116 may include a forward drive shaft 118, a rearward drive shaft 120, an inter-wheel differential 122, and left and right rear axle shafts 124 and 126. Drive-line 116 has been illustrated and described as including shafts 118, 120, 124 and 126 primarily to facilitate understanding of the overall vehicle drive system 110, and not by way of limitation. For example, there may be fewer or more shafts and the shafts may be permanently or selectively connected to one another by way of clutches.

Hydraulic drive/charging system 102 is directed to the storing and releasing of hydraulic energy. As illustrated generally in FIG. 1, hydraulic drive/charging system 102 includes a pump-motor 128 for selectively converting hydraulic energy, stored in the form of high pressure gas in a high pressure accumulator 130, to mechanical energy, as well as converting mechanical energy associated with vehicle drive system 110, and in particular drive-line 116, to hydraulic energy. A transfer case 132 operably connects drive-line 116 to pump-motor 128. Mechanical energy associated with drive-line 116 is transferred through transfer case 132 to pump-motor 128. Pump-motor 128 converts the mechanical energy to hydraulic energy by compressing a low pressure hydraulic fluid delivered to pump-motor 128 from a low pressure reservoir 134. The pressurized hydraulic fluid is transferred from pump-motor 128 to high pressure accumulator 130 for storage. The stored energy can be converted back to mechanical energy by passing the high pressure hydraulic fluid through pump-motor 128, which converts the stored energy to mechanical energy that can be output from transfer case 132. The low pressure hydraulic fluid discharged from pump-motor 128 is returned to low pressure reservoir 134 for storage. An end cover 136 may include various valves and controls for controlling the distribution of hydraulic fluid between low pressure reservoir 134, pump-motor 128, and high pressure accumulator 130.

As previously noted, vehicle power plant 112 may include an electric motor for converting electrical energy to mechanical energy for propelling vehicle 100. Power for operating the electric motor can be supplied by one or more batteries 138. Operating the electric motor depletes the energy stored within battery 138, requiring the battery to be occasionally recharged. As illustrated in FIG. 1 vehicle 100 may include a battery charging system 140 for selectively charging battery 138 while operating vehicle 100. Charging system 140 may not be capable of fully charging battery 138 depending on the state of discharge of the battery. Partially charging battery 138, however, may nevertheless increase the amount of time the electric motor may be operated before battery 138 needs to be fully recharged. Battery charging system 140 may include an alternator 142, or other suitable electric current producing source, such as a generator, to produce the desired electric current for charging battery 138. Battery charging system 140 may also include various known electronics 144 for suitably conditioning the electric current for charging battery 138, such as may be required for converting alternating current to direct current. When alternator 142, or another similar device, is used to generate electric current, the mechanical energy required to operate alternator 142 may be supplied from hydraulic drive/charging system 102.

There are various arrangements by which the energy stored within hydraulic drive/charging system 102 can be transferred to alternator 142, two of which are illustrated in FIG. 1. One exemplary arrangement is to suitably couple alternator 142 to an output of transfer case 132, thus enabling mechanical energy produced by pump-motor 128 to be transferred through transfer case 132 to alternator 142. Another exemplary arrangement is to provide a separate hydraulic motor 146 with which to power alternator 142. Hydraulic motor 146 operates in similar manner as pump-motor 128 when operating as a motor. Energy stored in high pressure accumulator 130 is converted to mechanical energy by passing the high pressure hydraulic fluid through hydraulic motor 146, which outputs a rotational torque for operating alternator 142. Low pressure hydraulic fluid discharged from hydraulic motor 146 is returned to low pressure reservoir 134 for storage. For purposes of illustrative convenience, both approaches for transferring energy stored within hydraulic drive/charging system 102 to alternator 142 are illustrated in FIG. 1, and it shall be understood that both approaches do not have to be present in the same system, although they can be. The two exemplary arrangements may be used independently of one another or together in the same system depending on the design and performance requirements of the particular application. It is also to be understood that the two disclosed illustrative arrangements are merely to facilitate discussion and are not limiting.

With continued reference to FIG. 1, hydraulic drive/charging system 102 includes transfer case 132, hydrostatic pump-motor 128, end cover 136, hydraulic motor 146, low pressure reservoir 134, a filter assembly 148, and high pressure accumulator 130. Low pressure reservoir 134 is a type of accumulator, but of the low pressure type, as opposed to high pressure accumulator 130. More generally, accumulator 130 is an example of a high pressure storage device while reservoir 134 is an example of a low pressure storage device.

While the various components are illustrated having particular physical structures for convenience of discussion, it is possible for any or all of the components to be within a single or a subset of structures. Merely by way of example, pump-motor 128 and hydraulic motor 146 may be incorporated within end cover 136. Furthermore, pump-motor 128, end cover 136, transfer case 132 and hydraulic motor 146 may be located within a single structure. Moreover, not all components or sub-components (e.g., a specific element) are required. For instance, various components may not be required depending on the approach used for transferring energy stored within hydraulic drive/charging system 102 to alternator 142. As noted previously, FIG. 1 illustrates two separate approaches for transferring energy between hydraulic drive/charging system 102 and alternator 142. One approach entails suitably coupling alternator 142 to transfer case 132, and the other involves providing a separate hydraulic motor 146 to power alternator 142. It should be noted that, for purposes of illustrative convenience, the two alternators 142 associated with the respective approaches are shown in FIG. 1 electrically connected to separate batteries 138. It shall be understood, however, that if both approaches are incorporated into a common system (though they need not be), each alternator may also be electrically connected to a common battery. If power for operating alternator 142 is drawn from transfer case 132, hydraulic motor 146 and its associated flow structure, including conduits 152 and 154, may not be required. Conversely, if power for operating alternator 142 is provided by hydraulic motor 146, certain components within transfer case 132 may not be required, such as certain shafts, clutches and gearing for outputting power to alternator 142.

In general terms, pump-motor 128, hydraulic motor 146, and components within end cover 136 provide the hydraulic pathways for movement of a hydraulic fluid, such as oil, between low pressure reservoir 134 and high pressure accumulator 130. As illustrated in FIG. 1, transfer case 132 may operably connect hydraulic drive/charging system 102 to vehicle drive system 110 and alternator 142. Transfer case 132 may also be mechanically connected to pump-motor 128. Transfer case 132 may include one or more clutches and various gearing to selectively transfer torque between pump-motor 128 and drive shaft 120. Transfer case 132 may also include an alternator shaft 156 operably connecting hydraulic drive/charging system 102 to alternator 142. Transfer case 132 may include an alternator clutch and various gearing to selectively transfer torque between pump motor 128 to alternator 142. It should be noted that the clutch and gearing for connecting pump-motor 128 to alternator 142 may not be required if transfer case 132 is not used to transfer mechanical energy from pump-motor 128 to alternator 142, such as may occur, for example, when using hydraulic motor 146 to power alternator 142.

Pump-motor 128 is used to convert between mechanical energy associated with drive shaft 120, and hydraulic energy stored in the form of pressure within hydraulic drive/charging system 102. Under normal operation of hydraulic drive/charging system 102 in a pumping mode, for example, mechanical energy is stored as hydraulic energy. Conversely, in normal operation of hydraulic drive/charging system 102 in a motoring or battery charge mode, hydraulic energy is converted to mechanical energy.

Typically, vehicle drive system 110, including hydraulic drive/charging system 102, may operate in three different modes at different times. In a first mode of vehicle drive system 110, called a regeneration or pumping mode (typically occurring during a deceleration or braking cycle), a vehicle slows down, such as by an operator signaling a braking operation. Kinetic energy of the vehicle then drives pump-motor 128 as a pump, transferring hydraulic fluid from low pressure reservoir 134 to high pressure accumulator 130, and removing additional torque from drive shaft 120. In the illustrated vehicle drive system 110, energy comes from rear drive wheels 104 in the form of torque, through axle shafts 124 and 126, through differential 122, and then by way of drive shaft 120 to transfer case 132. In some approaches, wheels 106 may include appropriate shafting and related mechanisms to permit a similar recovery of kinetic energy. Energy of braking is transferred from drive shaft 120 through transfer case 132 to pump-motor 128. When a nitrogen gas accumulator is used, the fluid compresses the nitrogen gas within the accumulator 130 and pressurizes hydraulic drive/charging system 102. Under some circumstances, it may be possible to undertake a regeneration or pumping mode using power plant 112 by way of transmission 114 and shaft 118, which may be operably connected to transfer case 132.

In a second mode of vehicle drive system 110, referred to as a launch assist or motoring mode (typically occurring in an acceleration cycle), fluid in high pressure accumulator 130 is metered out to drive pump-motor 128 operating as a motor. Pump-motor 128 applies torque to drive shaft 120, and then through differential 122, axle shafts 124 and 126, and finally to wheels 104. The motoring mode stops when a selected portion of the available pressure is released from high pressure accumulator 130. Before motoring can again commence, regeneration of high pressure accumulator 130 using the pumping mode will need to occur.

In a third mode of vehicle drive system 110, called a battery charge mode, which typically occurs when the vehicle is not operating in a braking cycle (although it may occur during a braking cycle when high pressure accumulator 130 is generally fully pressurized), fluid in the high pressure accumulator 130 is metered out either to pump-motor 128 or hydraulic motor 146, depending on whether transfer case 132 or hydraulic motor 146 is used to power alternator 142, at a flow rate dictated by the charge rate of battery 138. When using transfer case 132 to power alternator 142, torque generated by pump-motor 128 is transferred through transfer case 132 to alternator shaft 156, and then to alternator 142. Alternator 142 generates an electric current for at least partially charging battery 138. When using hydraulic motor 146 to power alternator 142, torque produced by hydraulic motor 146 is transferred through a shaft 158 to alternator 142. The battery charge mode stops when a selected portion of the pressure is released from high pressure accumulator 130. At least partial regeneration of high pressure accumulator 130 using the pumping mode needs to occur before battery charging can again commence.

A controller 160 at least partly controls hydraulic drive/charging system 102. Various informational inputs are received by controller 160, and then heuristics, i.e., logical rules or processes, are applied to the inputs. Outputs are then generated that influence operation of hydraulic drive/charging system 102 in the context of the overall operation of drive system 110 and battery charging system 140 of vehicle 100. While a separate controller 160 is illustrated, controller 160 may be incorporated into an overall vehicle electronic control unit (ECU) or as part of an ECU associated with engine 112 or transmission 114, or some combination thereof.

Continuing to refer to FIG. 1, drive/charging system 102 may include a filter assembly 148. It is envisioned that various filter assemblies 148 may be used within hydraulic drive/charging system 102. One exemplary filter assembly 148 is discussed in co-pending application Ser. No. 11/408,504, which is a continuation-in-part of application Ser. No. 10/828,590 and a continuation-in-part of Ser. No. 10/624,805, all of which are incorporated herein in their entirety. Filter assembly 148 is in communication with a port of low pressure reservoir 134 by means of a conduit 164, disposed on the "low pressure" side of hydraulic drive/charging system 102. The operation of an exemplary filter assembly 148 in the context of a hydraulic drive system, such as exemplary hydraulic drive/charging system 102, is discussed in greater detail in U.S. Pat. No. 6,971,232, the contents of which are incorporated herein by reference in their entirety.

In one illustration, pump-motor 128 is of the variable displacement type. However, pump-motor 128 may be of many types of construction, including but not limited to, bent axis, vane, or radial piston.

End cover 136 may include a mode control valve assembly 166 for selectively controlling the flow of fluid between low pressure reservoir 134 and high pressure accumulator 130 when operating in the pumping or drive mode, as well as when operating in the battery charge mode where transfer case 132 provides the torque for driving alternator 142. The operation of an exemplary mode control valve assembly 166 in the context of a hydraulic drive system, such as exemplary hydraulic drive/charging system 102, is discussed in greater detail in U.S. Pat. No. 6,971,232, the contents of which are incorporated herein by reference in their entirety.

High pressure accumulator 130 is illustrated as being located outside of end cover 136. However, as noted above, in some cases components, such as high pressure accumulator 132, can be located in the same physical housing or structure as those discussed with respect to end cover 136. Similarly, components physically located within end cover 136, for example, may be associated with other structures without precluding proper operation of hydraulic drive/charging system 102.

High pressure accumulator 130 represents the termination of the "high pressure" side of hydraulic drive/charging system 102. By way of example only, high pressure accumulator 130 may be of the gas-charge type. A gas-charge accumulator typically includes a rigid outer shell 168 defining an internal chamber 170. Internal chamber 170 is typically divided into a liquid chamber 172 and a gas chamber 174. There exist various alternatives for separating the two chambers, including but no limited to, an elastic diaphragm, an elastic bladder, or a floating piston. The various alternatives are represented generically by a single line 175 bisecting high pressure accumulator 130. Liquid chamber 172 receives pressurized hydraulic fluid from pump-motor 128 when operating the hydraulic drive/charging system 102 in the pumping mode. Gas chamber 174 generally contains a compressible gas, such as nitrogen for example. The pressurized hydraulic fluid received from pump-motor 128 compresses the volume of gas in accumulator 130. The compressed gas provides the compressive force necessary for discharging the hydraulic fluid from accumulator 130 when operating the hydraulic drive/charging system 102 in the motoring or battery charging mode. At the end of a typical deceleration cycle (pumping mode), high pressure accumulator 130 is may be charged up to the maximum system pressure, typically about 5000 pounds per square inch (PSI), but possibly even higher.

Low pressure reservoir 134 represents the termination of the "low pressure" side of hydraulic drive/charging system 102. A conduit 176 provides hydraulic fluid to low pressure reservoir 134 by way of filter assembly 148, while conduit 178 represents the pathway by which fluid is removed from the reservoir, such as when charging high pressure accumulator 130.

Reservoir 134 may include a hydraulic fluid level sensor 180 and a hydraulic fluid temperature sensor 182. The sensors may be analog, digital, or of any type performing the requested function. The level of fluid within low pressure reservoir 134 increases as motoring and battery charging takes place, and decreases as pumping removes fluid from the reservoir to recharge high pressure accumulator 130. The fluid level is also increased when hydraulic drive/charging system 102 is shut down. Typically, the temperature of the hydraulic fluid will increase as hydraulic drive/charging system 102 is utilized, but is also influenced by outside environmental conditions, such as ambient temperature.

Figure 2:
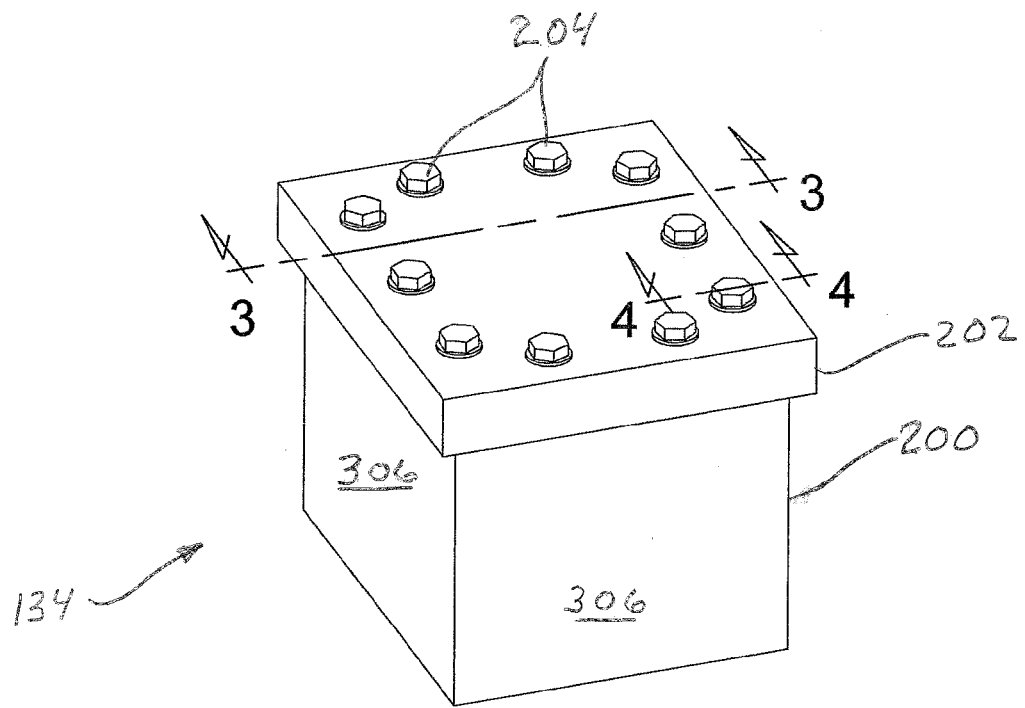
FIG. 2 illustrates an exemplary low pressure reservoir employed with the hydraulic drive/charging system, the reservoir including a pressure relief mechanism.
Figure 3:
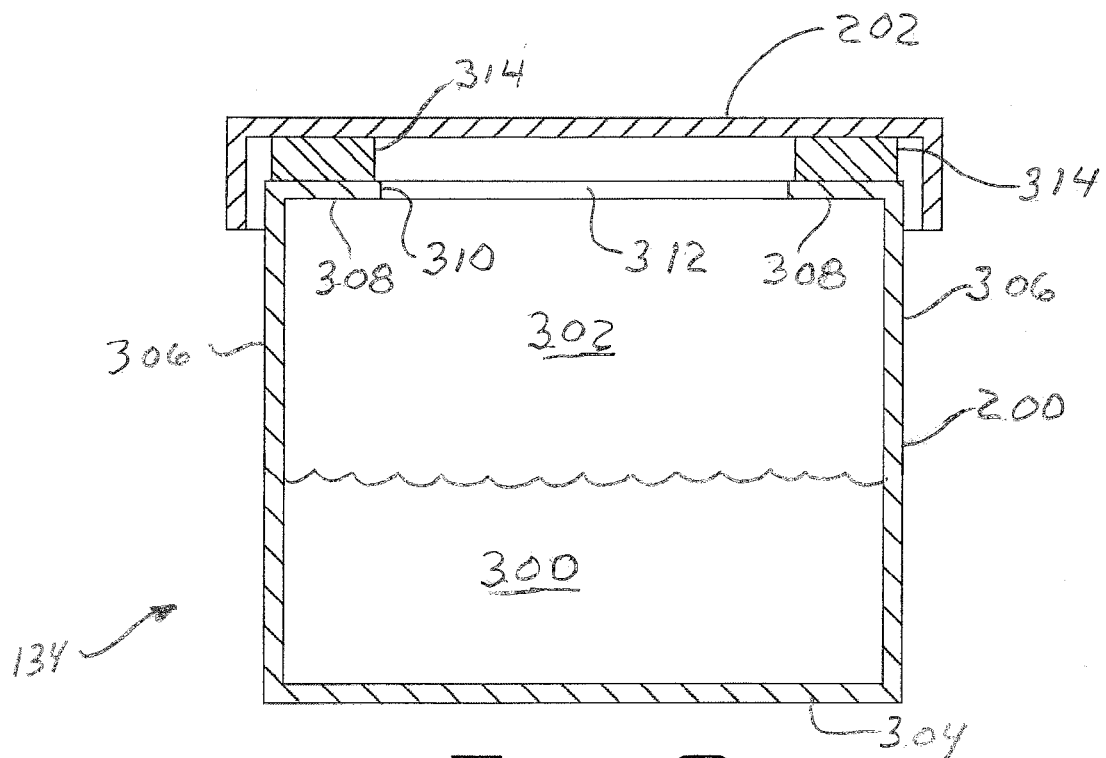
FIG. 3 is a partial cross-sectional side elevational view of the low pressure reservoir, taken along section line 3-3 of FIG. 2, with the pressure relief mechanism shown in a deactivated position.

Referring to FIGS. 2 and 3, an exemplary low pressure reservoir 134 may include a reservoir tank 200 for capturing and storing a hydraulic fluid 300 employed in hydraulic drive/charging system 102. To prevent dirt and other containments from collecting in the reservoir tank 200, as well as preventing hydraulic fluid from spilling from the tank, reservoir 134 may include a cover 202 that is selectively engagable with an upper end of reservoir tank 200. Hydraulic fluid 300 may be withdrawn from reservoir tank 200 when operating hydraulic drive/charging system 102 in the pumping mode, and may be returned to the tank when operating the hydraulic drive/charging system in the motoring mode.

Reservoir tank 200 may have any of a variety of different geometric configurations depending, at least in part, on the requirements of the particular application. In the exemplary configuration shown in FIGS. 2 and 3, reservoir tank 200 is shown to have a generally rectangular shape. It shall be appreciated, however, that in practice other geometric configurations may also be employed. For example, placement and packaging requirements of reservoir tank 200 within a vehicle may dictate that reservoir tank 200 be multi-facetted and/or include various contoured surfaces to enable the tank to be installed within the allocated confines of the vehicle. Various geometric configurations that may be employed, include, but are not limited to, spherical, cylindrical, rectangular, and polygonal, among others, or any combination thereof. It shall be understood that the tank configuration illustrated in the figures merely represents one of a multitude of different geometric configurations that may be utilized. The particular geometric configuration depicted in the figures was selected for illustrative convenience only, and is thus not intended to be in any way limiting.

With continued reference to FIGS. 2 and 3, exemplary reservoir tank 200 includes an interior cavity 302 defined by a bottom panel 304 and a one or more side walls 306. Contained within interior cavity 302 is hydraulic fluid 300. Arranged near the top of side walls 306 is a flange 308 that extends inward from each of the side walls at an angle generally perpendicular to the walls. Flange 308 provides a generally continuous ledge extending around the entire inner perimeter of side walls 306. An inner edge 310 of the flange defines an aperture 312 that enables access to interior cavity 302 of reservoir tank 200. Aperture 312 provides a fluid path between interior cavity 302 and exterior region of reservoir 134.

Figure 4:
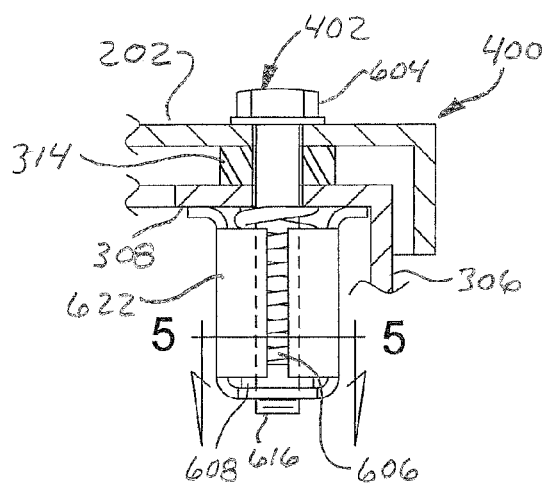
FIG. 4 is a partial cross-sectional view of a pressure responsive fastener employed with the pressure relief mechanism of FIG. 2, taken along section line 4-4 of FIG. 2, with the pressure relief mechanism shown in the deactivated position.
Figure 7:
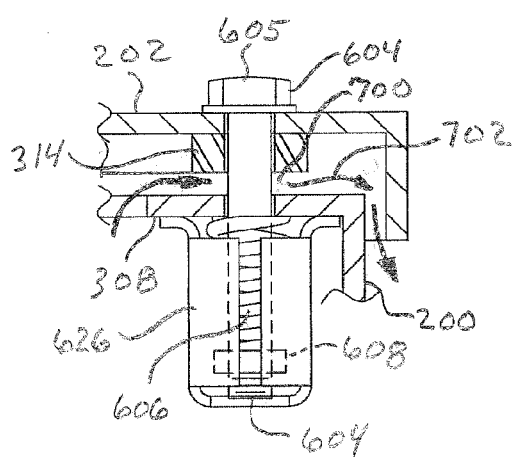
FIG. 7 is a partial cross-sectional view of the pressure responsive fastener of FIG. 4, with the pressure relief mechanism shown in an activated position.
Figure 6:
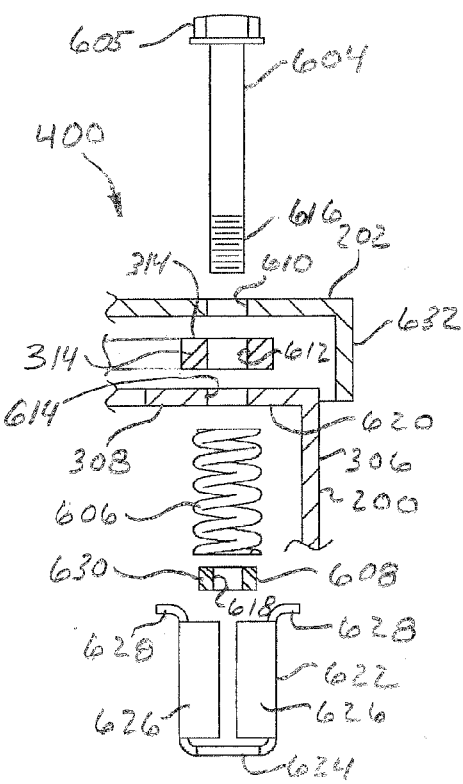
FIG. 6 is an exploded view of the pressure responsive fastener of FIG. 4.
Figure 8:
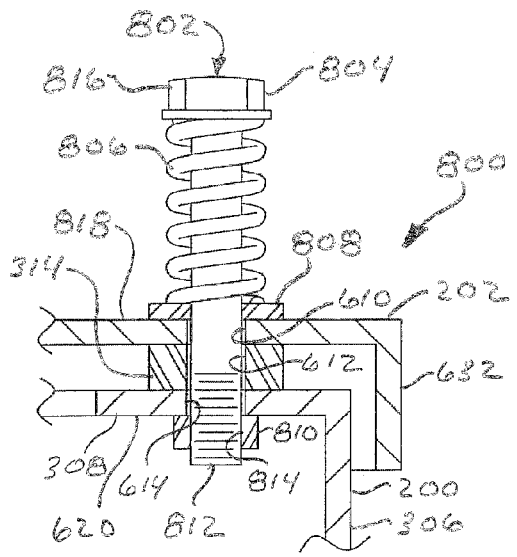
FIG. 8 is a partial cross-sectional view of an alternatively configured pressure responsive fastener employed with the pressure relief mechanism of FIG. 2, taken along section line 4-4 of FIG. 2, with the pressure relief mechanism shown in the deactivated position.
Figure 9:
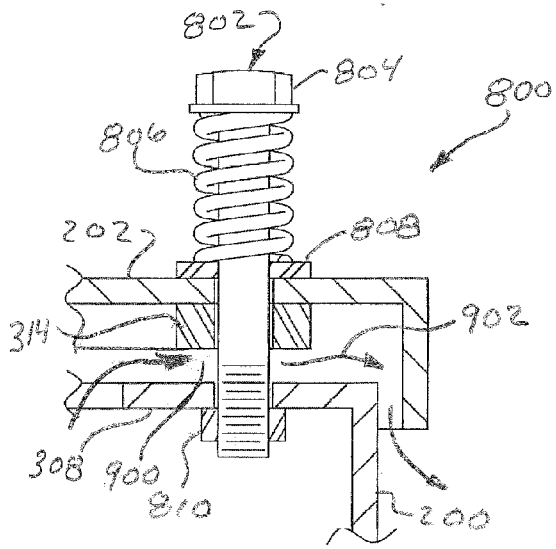
FIG. 9 is a partial cross-sectional view of the pressure responsive fastener of FIG. 8, with the pressure relief mechanism shown in an activated position.
Figure 10:
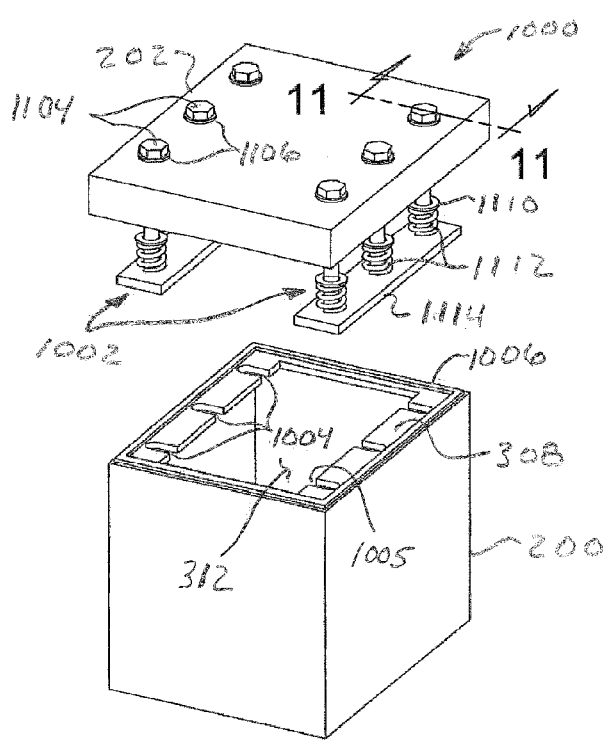
FIG. 10 is a perspective view of the reservoir employing an alternatively configured pressure relief mechanism, with the cover shown removed from the reservoir tank.
Figure 11:
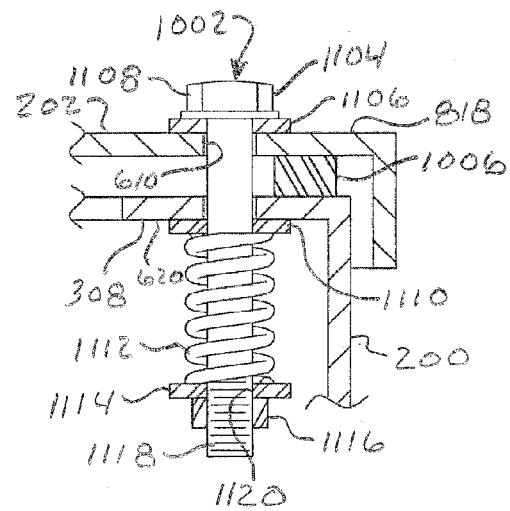
FIG. 11 is a partial cross-sectional view of a pressure responsive fastener employed with the pressure relief mechanism of FIG. 10, taken along section line 11-11 of FIG. 10, with the pressure relief mechanism shown in a deactivated position.
Figures 12, 13:
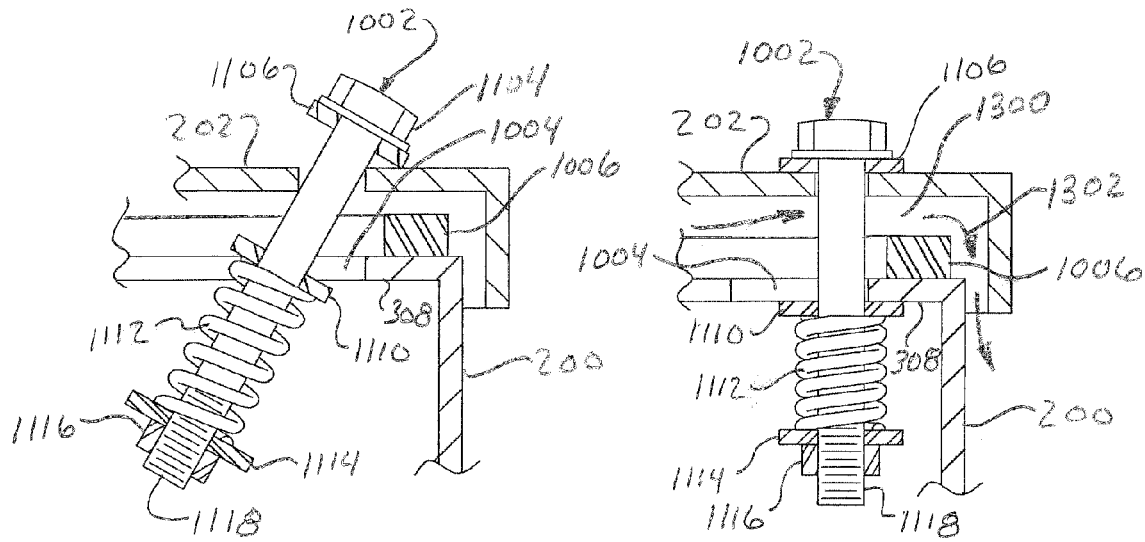
FIG. 12 is a partial cross-sectional view of the pressure responsive fastener of FIG. 11, the pressure responsive fastener shown pivoted to enable the cover to be attached to the reservoir tank.
FIG. 13 is a partial cross-sectional view of the pressure responsive fastener of FIG. 11, with the pressure relief mechanism shown in an activated position.

Cover 202 may be configured to completely cover aperture 312 when the cover is attached to reservoir tank 200. Cover 202 may be attached to reservoir tank 200 using one or more pressure responsive fasteners 204. Pressure responsive fasteners 204 includes various features that enable cover 202 to separate from reservoir tank 200 when the internal pressure within the tank exceeds a predetermined level, thereby allowing excess pressure to escape from reservoir 134. Cover 202 may be generally moved between a closed position, as shown in FIGS. 4, 8 and 11, wherein the cover engages reservoir tank 200 to substantially block the fluid path through aperture 312 of reservoir tank 200, and an open position, as shown in FIGS. 7, 9 and 13, wherein cover 202 is at least partially disengaged from reservoir tank 200, thereby opening the fluid path through aperture 312. The various features of pressure responsive fasteners 204 are discussed in more detail subsequently, with particular reference to FIGS. 4-13.

Pressure responsive fasteners 204 may be used to secure cover 202 to flange 308 of reservoir tank 200. A gasket 314 may be arranged between cover 202 and flange 308 to provide a more effective seal between the two components. Gasket 314 generally extends around the entire perimeter of aperture 312 in flange 308.

Reservoir tank 200 and cover 202 may be constructed from any of a variety of different materials, including but not limited to, metals, such as, steel (including stainless steel) and aluminum, plastics, fiberglass, and composite materials, among others. Reservoir tank 200 and cover 202 may be constructed from the same material or from different materials.

Reservoir 134 typically operates at a low internal pressure, which may range from atmospheric to slightly higher than atmospheric. For example, the internal operating pressure may fall in the range of zero bar (0 psi) to 0.14 bar (2 psi). Certain operating conditions or events, however, may cause the internal pressure to exceed the reservoir's generally expected maximum internal operating pressure. For example, a rupture occurring in flexible membrane 175 of high pressure accumulator 130 may allow the high pressure gas in chamber 174 to be transported to reservoir 134 when hydraulic drive/charging system 102 is operated in the motoring/charging mode. The high pressure gas may cause the internal pressure within reservoir 134 to rise beyond what would be expected under normal operating conditions. As discussed previously, flexible membrane 175 provides a barrier separating the high pressure gas present in chamber 174 from the hydraulic fluid present in chamber 172. A rupture occurring in membrane 175 may allow the high pressure gas and the hydraulic fluid to mix together. Operating hydraulic drive/charging system 102 in the motoring/charging mode will allow the gas/fluid mixture to pass through pump-motor 128 (operating as a motor) and into reservoir 134. Pump-motor 128 is generally more efficient at extracting stored pressure energy from a fluid than a gas. As a consequence, a substantial portion of the pressure energy stored in the gas may not be converted to mechanical energy as the gas/fluid mixture passes through pump-motor 128, but instead will continue to be stored in the gas as pressure. The gas/fluid mixture discharged from pump-motor 128 will thus arrive at reservoir 134 at a higher pressure than if only hydraulic fluid had passed through the pump-motor. The higher pressure of the gas/fluid mixture may cause the internal pressure in reservoir 134 to exceed the generally expected operating range.

To accommodate the potential higher internal pressure that may occur within reservoir 134, a pressure relief mechanism for allowing excess pressure to escape from the reservoir when the internal pressure exceeds a predetermined level may be employed. Various exemplary configurations of the pressure relief mechanism are described subsequently, with particular reference to FIGS. 4-22.

With reference to FIGS. 4-7, an exemplary pressure relief mechanism 400 includes cover 202 and a pressure responsive fastener 402 for releasably connecting the cover to flange 308 of reservoir tank 200. Pressure responsive fastener 402 may include a threaded fastener 604, a biasing member 606, such as a spring, and a threaded nut 608. Threaded fastener 604 may be configured as a bolt, screw, or similar fastener. Fastener 604 may include a head 605 that engages cover 202. Threaded fastener 604 slidably engages a set of generally coaxially aligned apertures 610, 612, and 614 in cover 202, gasket 314, and flange 308, respectively. Alternatively, threaded fastener 604 may fixedly engage aperture 610 in cover 202 and aperture 612 in gasket 314, for example, by configuring the respective connections as a press fit. Fastener 604 and cover 202 generally move concurrently or in unison when pressure relief mechanism 400 is actuated. Threaded fastener 604 includes a threaded end 616 that threadably engages a correspondingly threaded aperture 618 in nut 608. Biasing member 606 may be positioned over the shank of threaded fastener 604 and is held in place by nut 608. Biasing member 606 is trapped between a bottom surface 620 of flange 308 and nut 608.

To facilitate assembly of pressure relief mechanism 400, nut 608 and biasing member 606 may be captured or otherwise disposed within a retaining cup 622 that may be suitably attached to bottom surface 620 of flange 308. Since the interior of reservoir tank 200 cannot be accessed with cover 202 positioned on reservoir tank 200, retaining cup 622 provides a means for holding biasing member 606 and nut 608 in a suitable position to enable threaded fastener 402 to be attached to nut 608 from outside of reservoir 134.

Figure 5:
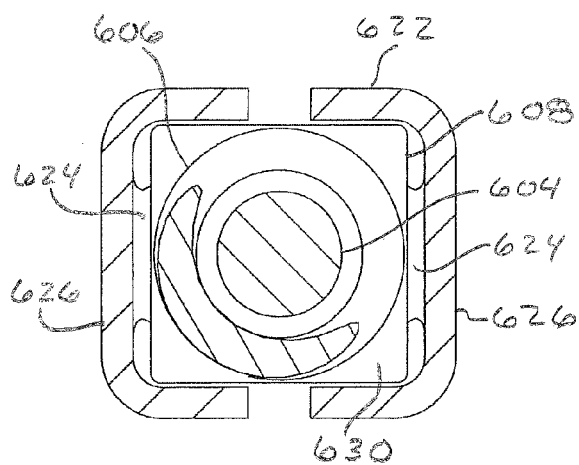
FIG. 5 is a partial cross-sectional view of the pressure responsive fastener of FIG. 4, taken along section line 5-5 of FIG. 4.

Retaining cup 622 may include a bottom wall 624 and at least two opposing side walls 626 extending from the bottom wall 624. Retaining cup 622 may also include one or more flanges 628 that provide a surface for securing the retaining cup 622 to flange 308, for example, by welding, brazing, soldering, gluing, among others. With particular reference to FIG. 5, opposing side walls 626 may be configured to engage edges 630 of nut 608 to prevent the nut from spinning when threaded fastener 604 is threaded onto nut 608. In the exemplary configuration shown in the figures, nut 608 is illustrated as a square nut, and opposing side walls 626 of retaining cup 622 are correspondingly shaped. On the other hand, if nut 608 were to have a different shape, such as a hex configuration, side walls 626 may likewise be similarly configured. It shall be appreciated that side walls 626 may also have a variety of other configurations, so long as at least one corner of nut 608 is capable of engaging at least one side wall 626 to prevent the nut from rotating when attaching threaded fastener 604 to nut 608. An opening may be provided in bottom wall 624 of retaining cup 622 to allow threaded end 616 of threaded fastener 604 to extend beyond the bottom of retaining cup 622. Retaining cup 622 will generally be deep enough to accommodate biasing member 606 and nut 608 without having to compress the biasing member when assembling the retaining cup to flange 308.

Pressure relief mechanism 400 may be assembled to reservoir tank 200 by positioning gasket 314 on top of flange 308 with aperture 612 in gasket 314 generally aligned with aperture 614 in flange 308. To facilitate positioning of gasket 314, the gasket may also be attached, for example, by means of an adhesive, to either the inside surface of cover 202 or the top surface of flange 308. With gasket 314 properly positioned, cover 202 may then be positioned onto reservoir tank 200 and secured to flange 308 by inserting threaded fastener 604 through apertures 610, 612 and 614 in cover 202, gasket 612, and flange 308, respectively, and threadably engaging the fastener with nut 608.

Pressure responsive fastener 402 is configured to enable cover 202 to separate from flange 308 when the internal pressure within reservoir 134 exceeds a predetermined limit. Pressure responsive fastener 402 generates a clamping force for securing cover 202 to flange 308. Biasing member 606 generates a biasing force tending to urge cover 202 into the closed positions, as shown in FIG. 4. The biasing force generated by biasing member 606 determines the magnitude of the clamping force. The internal pressure within reservoir 134 generates a force tending to separate cover 202 from flange 308. When the internal pressure within reservoir 134 exceeds the clamping force generated by biasing member 606, cover 202 will begin to separate from flange 308 by further compressing biasing member 606, as illustrated in FIG. 7. This results in a gap 700 forming between cover 202 and flange 308 (see FIG. 7), which allows pressurized gas 702, and possibly hydraulic fluid, to escape from reservoir 134. Discharging pressurized gas from reservoir 134 produces a corresponding drop in internal pressure within reservoir 134, which in turn causes cover 202 to be displaced back toward flange 308 in response to the biasing force generated by biasing member 606. Once the internal pressure drops below the pressure level for activating pressure relief mechanism 400, the gap between cover 202 and flange 308 will completely close to limit further escape of pressurized gas from reservoir 134.

The internal pressure level within reservoir 134 at which pressure relief mechanism 400 is activated is determined by a preload biasing force generated by biasing member 606. The "preload biasing force" is the biasing force generated by biasing member 606 with no internal pressure load on cover 202. The higher the preload biasing force the higher the internal pressure required to activate pressure relief mechanism 400. The preload biasing force generated by biasing member 606 is determined by how far threaded fastener 604 is threaded onto nut 608. The biasing force generated is a function of the amount of compression and the spring rate of biasing member 606. Biasing member 606 is compressed as threaded fastener 604 is threaded onto nut 608. The preload biasing force can be adjusted by selectively tightening and loosening fastener 604, thereby varying the distance between fastener head 605 and nut 608. Tightening fastener 604 compresses biasing member 606, thus increasing the preload biasing force, whereas loosening the fastener allows the biasing member to expand, thereby decreasing the preload biasing force. Increasing the amount of compression applied to biasing member 606 produces a corresponding increase in the preload biasing force generated, which in turn increases the internal pressure level within reservoir 134 required to activate pressure relief mechanism 400.

Cover 202 may include a cover flange 632 for controlling the direction in which the pressurized gas is discharged from reservoir 134 when pressure relief mechanism 400 is activated. In the exemplary configuration illustrated in the figures (see for example, FIG. 6), cover flange 632 extends generally downward from an outer peripheral edge of cover 202. This arrangement will tend to direct the discharged gas downward. Of course, it is envisioned that other arrangements may also be employed, depending on the requirements of the particular application.

Referring to FIGS. 8 and 9, an exemplary pressure relief mechanism 800 includes cover 202 and a pressure responsive fastener 802 for releasably connecting the cover to flange 308 of reservoir tank 200. Pressure responsive fastener 802 is configured similar to pressure responsive fastener 402, as shown in FIGS. 4-7. The primary difference being that the biasing member is arranged outside of reservoir 134, rather than inside the reservoir, which may eliminate the need for retaining cup 622.

Pressure responsive fastener 802 may include a threaded fastener 804, a biasing member 806, a washer 808, and a threaded nut 810. Threaded fastener 804 may be configured as a bolt, screw, or similar fastener. Threaded fastener 804 slidably engages generally coaxially aligned apertures 610, 612, and 614, in cover 202, gasket 314, and flange 308, respectively. Threaded fastener 804 includes a threaded end 812 that threadably engages a correspondingly threaded aperture 814 in nut 810. Fastener 804 remains generally fixed relative to reservoir tank 200 when pressure relief mechanism 800 is activated. Biasing member 806 is arranged over the shank of threaded fastener 804. One end of biasing member 806 engages an underside surface of a head 816 of threaded fastener 804, and an opposite end bears against washer 808, which itself engages a top surface 818 of cover 202. Biasing member 806 and washer 808 are thus trapped between head 816 of fastener 804 and top surface 818 of cover 202.

To facilitate assembly of pressure responsive fastener 802, nut 810 may be suitably attached to bottom surface 620 of flange 308, for example, by welding, brazing, gluing, among others. Nut 810 may also be attached using various mechanical means, such as clips, brackets, screws, and rivets, among others. Nut 810 may be eliminated by configuring aperture 614 to include a thread suitable for engaging threaded end 812 of threaded fastener 804.

Pressure relief mechanism 800 may be assembled to reservoir tank 200 by positioning gasket 314 on top of flange 308 with aperture 612 of gasket 314 generally aligned with aperture 614 of flange 308. To facilitate positioning of gasket 314, the gasket may be attached, for example, by means of an adhesive, to either the inside surface of cover 202 or the top surface of flange 308. With gasket 314 properly positioned, cover 202 may then be positioned onto reservoir tank 200. Biasing member 806 is slid over the shank of threaded fastener 804, followed by washer 808. Cover 202 may be secured to flange 308 by guiding threading fastener 804 through the apertures in cover 202, gasket 314 and flange 308, and threadably engaging the fastener with nut 810.

Pressure responsive fastener 802 operates in a similar manner as pressure responsive fastener 402. Pressure responsive fastener 802 is configured to enable cover 202 to separate from flange 308 when the internal pressure within reservoir 134 exceeds a predetermined limit. Pressure responsive fastener 802 generates a clamping force for securing cover 202 to flange 308. Biasing member 806 generates a biasing force tending to urge cover 202 into the closed positions, as shown in FIG. 8. The biasing force generated by biasing member 806 determines the magnitude of the clamping force. When the internal pressure within reservoir 134 exceeds the clamping force generated by biasing member 806, cover 202 will begin to separate from flange 308 as biasing member 806 is further compressed, as illustrated in FIG. 9. This results in a gap 900 forming between cover 202 and flange 308 (see FIG. 9), which allows pressurized gas 902, and possibly hydraulic fluid, to escape from reservoir 134. Discharging pressurized gas from reservoir 134 produces a corresponding drop in internal pressure within reservoir 134, which in turn causes cover 202 to be displaced back toward flange 308 in response to the biasing force generated by biasing member 806. Once the internal pressure drops below the pressure level for activating pressure relief mechanism 800, the gap between cover 202 and flange 308 completely closes to limit further escape of pressurized gas from reservoir 134.

The internal pressure level within reservoir 134 at which pressure relief mechanism 800 is activated is determined by a preload biasing force generated by biasing member 806. The "preload biasing force" is the biasing force generated by biasing member 806 with no internal pressure load applied to cover 202. The higher the preload biasing force the higher the internal pressure required to activate pressure relief mechanism 800. The preload biasing force generated by biasing member 806 may be controlled by how far threaded fastener 804 is threaded onto nut 810. The preload biasing force generated is a function of the amount of compression and the spring rate of biasing member 806. Biasing member 806 is compressed as threaded fastener 804 is threaded onto nut 810. The preload biasing force can be adjusted by selectively tightening and loosening threaded fastener 804, thereby varying the distance between fastener head 816 and nut 810. Tightening threaded fastener 804 compresses biasing member 806, thus increasing the preload biasing force, whereas loosening the fastener allows the biasing member to expand, thereby decreasing the preload biasing force. Increasing the amount of compression on biasing member 806 produces a corresponding increase in the biasing force generated, which in turn increases the internal pressure level within reservoir 134 required to activate pressure relief mechanism 800.

With reference to FIGS. 10-13, an exemplary pressure relief mechanism 1000 includes cover 202 and a pressure responsive fastener 1002 for releasably connecting the cover to flange 308 of reservoir tank 200. Pressure responsive fastener 1002 is configured similar to pressure responsive fastener 402, as shown in FIGS. 4-7, but incorporates a slightly different mechanism for assembling pressure relief mechanism 1000 to reservoir tank 200. Pressure responsive fastener 1002 may include a threaded fastener 1104; a first washer 1106 mounted on a shank of fastener 1104 and disposed between a head 1108 of the threaded fastener and top surface 818 of cover 202; a second washer 1110 mounted on the shank of fastener 1102 and engaging bottom surface 620 of flange 308; a biasing member 1112 mounted on the shank of fastener 1102 and engaging second washer 1110; a connecting bar 1114 mounted on the shank of fastener 1102 and engaging an end of biasing member 1112 opposite second washer 1110; and a nut 1116 threadably engaging a threaded end 1118 of fastener 1104. Connecting bar 1114 may included a plurality of apertures 1120 for engaging corresponding threaded fasteners 1104 arranged along a common edge of reservoir 134. Connecting bar 1114 facilitates the assembly of pressure relief mechanism 1000 to reservoir tank 200, as discussed in more detail subsequently. Second washer 1110, biasing member 1112 and connecting bar 1114 are trapped between bottom surface 620 of flange 308 and nut 1116 when pressure relief mechanism 1000 is attached to reservoir tank 200.

Pressure responsive fastener 1002 may be assembled to cover 202 by sliding first washer 1106 onto the shank of fastener 1104. Fastener 1104 may then be inserted in aperture 610 of cover 202. Aperture 610 may be sized large enough to allow fastener 1104 to be pivoted relative to cover 202, as shown in FIG. 12. Fastener 1104 slidably engages aperture 610. Second washer 1110, biasing member 1112 and connecting bar 1114 may then be slid sequentially onto the shank of fastener 1104. The components are retained on fastener 1104 by threading nut 1116 onto end 1118 of the fastener. To facilitate attachment of fastener 1104 to nut 1116, nut 1116 may be fixedly attached to cross member 1114 to prevent the nut from turning while the fastener is being threaded onto the nut. Various options for attaching nut 1116 to cross member 1114, include but are not limited to, welding, brazing, gluing, soldering, clips, screws, and rivets, among others. Aperture 1120 in cross member 1114 may also be suitably threaded for engaging threaded end 1118 of fastener 1104, which may eliminate the need for nut 1116.

Pressure release mechanism 1000 may be attached to reservoir tank 200 by slidably engaging fastener 1104 with an elongated slot 1004 formed in flange 308 of reservoir tank 200. Slot 1004 includes an open end 1005 formed where the slot intersects inner edge 310 of flange 308. Fastener 1104 can be engaged with slot 1104 by first pivoting pressure responsive fastener 1002 inward toward the center of cover 202, as shown in FIG. 12. Each of the threaded fasteners 1004 arranged along a common edge of cover 202 may be tied together by a single connecting bar 1114. This arrangement enables the interconnected pressure fasteners 1002 to be pivoted at least generally simultaneously, which simplifies the task of engaging threaded fasteners 1004 with corresponding slots 1004 in flange 308.

With pressure responsive fasteners 1104 pivoted toward the center of cover 202, as shown in FIG. 12, cover 202 may be attached to reservoir tank 200 by first passing pressure responsive fasteners 1104 through aperture 312 in the top of reservoir tank 200, followed by engaging cover 202 with a gasket 1006 arrange along an upper surface of flange 308. Gasket 1006 enhances sealing between cover 202 and flange 308 to minimize leakage of hydraulic fluid and/or pressurized gas from reservoir 134. Gasket 1006 may be arranged around the entire circumference of flange 308.

With cover 202 properly positioned on reservoir tank 200, pressure responsive fasteners 1002 are allowed to drop down to a generally vertical position, as shown in FIG. 11, and into engagement with slot 1004 in flange 308. Cover 202 may be secured to reservoir tank 200 by tightening threaded fastener 1004 to compress biasing member 1112 and achieve a desired clamping force between cover 202 and flange 308.

Pressure responsive fastener 1002 is configured to enable cover 202 to separate from flange 308 when the internal pressure within reservoir 134 exceeds a predetermined limit. Pressure responsive fastener 1002 generates a clamping force for securing cover 202 to flange 308. The biasing force generated by biasing member 1112 determines the magnitude of the clamping force. The internal pressure within reservoir 134 generates a force tending to separate cover 202 from flange 308. When the internal pressure within reservoir 134 exceeds the clamping force generated by biasing member 1112, cover 202 will begin to separate from flange 308 by further compressing biasing member 606, as illustrated in FIG. 13. This results in a gap 1300 forming between cover 202 and flange 308 (see FIG. 13), which allows pressurized gas 1302, and possibly hydraulic fluid, to escape from reservoir 134. Discharging pressured gas from reservoir 134 produces a corresponding drop in internal pressure within reservoir 134, which in turn causes cover 202 to be displaced back toward flange 308 in response to the biasing force generated by biasing member 1112. Once the internal pressure drops below the pressure level for activating pressure relief mechanism 1000, the gap between cover 202 and flange 308 completely closes to limit further escape of pressurized gas from reservoir 134.

The internal pressure level within reservoir 134 at which pressure relief mechanism 1000 is activated is determined by a preload biasing force generated by biasing member 1112. The "preload biasing force" is the biasing force generated by biasing member 1112 with no internal pressure load on cover 202. The higher the preload biasing force the higher the internal pressure required to activate pressure relief mechanism 1000. The preload biasing force generated by biasing member 1112 can be controlled by how far threaded fastener 1004 is threaded onto nut 1116. The preload biasing force generated is a function of the amount of compression and the spring rate of biasing member 1112. Biasing member 1112 is compressed as threaded fastener 1004 is threaded onto nut 1116. The biasing force can be adjusted by selectively tightening and loosening fastener 1004. Tightening fastener 1004 compresses biasing member 1112, thus increasing the biasing force, whereas loosening the fastener allows the biasing member to expand, thereby decreasing the biasing force. Increasing the amount of compression produces a corresponding increase in the preload biasing force, which in turn increases the internal pressure level within reservoir 134 required to activate pressure relief mechanism 1000.

Figure 14:
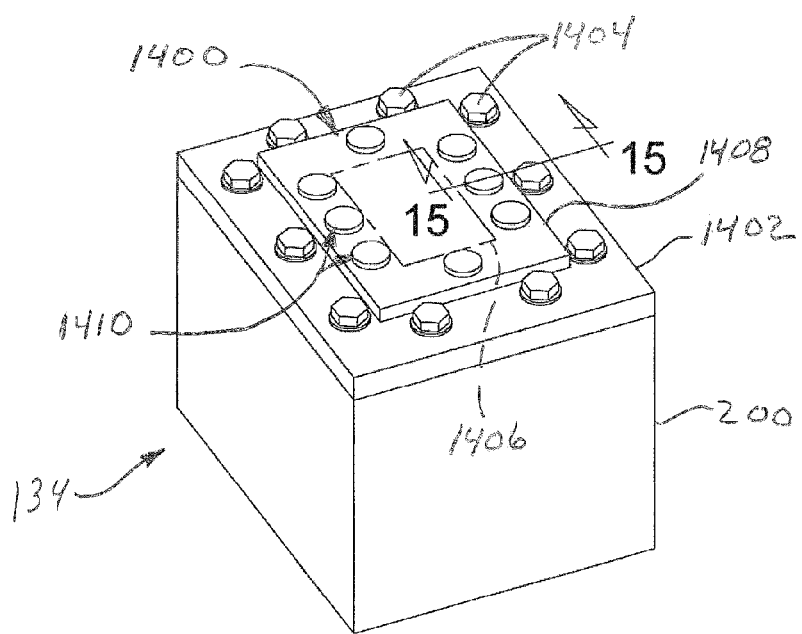
FIG. 14 is a perspective view the reservoir employing an alternatively configured pressure relief mechanism.
Figures 15, 16:
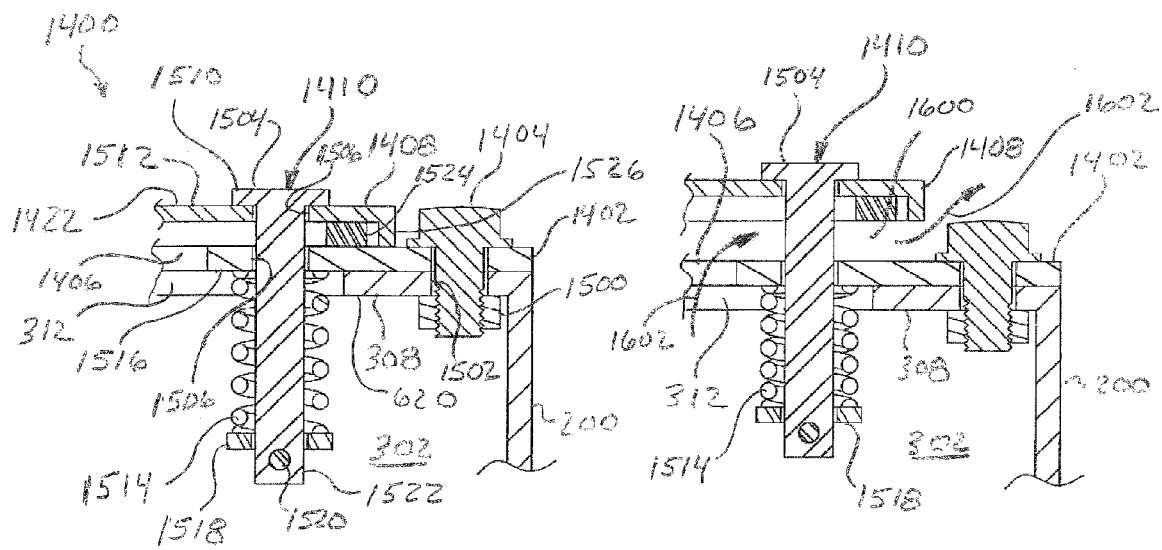
FIG. 15 is a partial cross-sectional view of a pressure responsive fastener employed with the pressure relief mechanism of FIG. 14, taken along section line 15-15 of FIG. 14, with the pressure relief mechanism shown in a deactivated position.
FIG. 16 is a partial cross-sectional view of the pressure responsive fastener of FIG. 15, with the pressure relief mechanism shown in an activated position.

With reference to FIGS. 14-16, an exemplary pressure relief mechanism 1400 is shown attached to a cover plate 1402. Cover plate 1402 at least partially covers aperture 312 in flange 308. Although not shown in FIGS. 15-16, a gasket may be provided between cover plate 1402 and flange 308 to enhance sealing and minimize leakage of pressurized gas and/or hydraulic fluid through the joint interface.

Cover plate 1402 may be attached to flange 308 using fasteners 1404. For purposes of discussion, fastener 1404 is illustrated in the exemplary configuration as a threaded bolt;

however, it shall be appreciated that other attachment devices may also be employed, such as screws and rivets. In the exemplary configuration, fastener 1404 threadably engages a nut 1500 arranged on the underside of flange 308. To facilitate attachment of cover plate 1402 to flange 308, nut 1500 may be suitably attached to bottom surface 620 of flange 308, such as by welding, brazing, soldering, gluing, clips, among others. An aperture 1502 in flange 308 may also be suitably configured to threadably engage fastener 1404, thereby eliminating the need for nut 1500.

Cover plate 1402 includes a pressure bleed aperture 1406 that is in fluid communication with interior cavity 302 of reservoir 134. Pressure bleed aperture 1406 provides a fluid pathway for allowing excess pressure to escape from reservoir 134. Pressure relief mechanism 1400 operates to selectively open and close the fluid path through pressure bleed aperture 1406 in response to the pressure within interior cavity 302.

Pressure relief mechanism 1400 may include a pressure plate 1408 positioned overtop pressure bleed aperture 1406. Pressure plate 1408 may be selectively moved into and out of engagement with cover plate 1402 in response to the internal pressure within reservoir 134. Pressure plate 1408 completely covers pressure bleed aperture 2003 when engaged with cover plate 1902. Pressure plate 1408 is movable between a closed position, as shown in FIG. 15, wherein pressure plate 1408 engages cover plate 1402 to substantially block the fluid path through pressure bleed aperture 1406, and an open position, as shown in FIG. 16, wherein pressure plate 1408 is at least partially disengaged from cover plate 1402, thereby opening the fluid path through bleed aperture 1406.

Pressure relief mechanism 1400 may include a pressure responsive fastener 1410 for releasably connecting pressure plate 1408 to cover plate 1402. Pressure responsive fastener 1410 may include a pin 1504 that engages an aperture 1506 in pressure plate 1408 and an aperture 1508 in cover plate 1402. A head 1510 of pin 1504 engages a top surface 1512 of pressure plate 1408. A Biasing member 1514 is arranged on a shank of pin 1504, such that one end of biasing member 1514 engages a bottom surface 1516 of cover plate 1402. Also arranged on the shank of pin 1504 is a washer 1518 that engages an end of biasing member 1514 opposite flange 308. Biasing member 1514 and washer 1518 may be retained on pin 1504 by a roll pin 1520 that engages an aperture formed in an end 1522 of pin 1504. Other means for retaining biasing member 1514 and washer 1518 to pin 1504 may include, but are not limited to, a cotter pin, screw, rivet, as well as others. Further, end 1522 of pin 1504 may also be threaded to accept a correspondingly threaded nut. Biasing member 1514 is trapped between bottom surface 1516 of cover plate 1402 and washer 1518.

A gasket 1524 may be arranged between pressure plate 1408 and cover plate 1402 to enhance sealing between the two components. Gasket 1524 may extend around the entire periphery of opening 1406 in cover plate 1402. Gasket 1524 may be suitably attached, for example, by means of an adhesive, to either pressure plate 1408 or cover plate 1402. For purposes of discussion, gasket 1524 is shown attached to pressure plate 1408 in FIG. 16. The amount by which gasket 1524 is compressed when pressure relief mechanism 1400 is deactivated may be controlled by providing a boss 1526 extending generally downward from a bottom surface of pressure plate 1408. Boss 1526 may be generally arranged around the perimeter of pressure plate 1408. Boss 1526 engages cover plate 1402 when pressure relief mechanism 1400 is deactivated. Boss 1526 may be configured as a continuous uninterrupted ring or may consist of multiple individual features arranged around the perimeter of pressure plate 1408.

Pressure relief mechanism 1400 may be assembled to cover plate 1402 by positioning pressure plate 1408 over pressure bleed aperture 1406 in cover plate 1402 so as to generally align the pin receiving apertures in the pressure plate with those in the cover plate. Pin 1504 may then be inserted through the apertures in pressure plate 1408 and cover plate 1402. Biasing member 1514 and washer 1518 may then be slid sequentially onto the shank of pin 1504. The components may be retained on pin 1504 by inserting roll pin 1520 into the corresponding aperture in end 1522 of pin 1504. The entire assembly may then be attached to flange 308 of reservoir tank 200 using fastener 1404.

Pressure responsive fastener 1410 is configured to enable pressure plate 1408 to separate from cover plate 1402 when the internal pressure within reservoir 134 exceeds a predetermined limit. Pressure responsive fastener 1410 generates a clamping force for securing pressure plate 1408 to cover plate 1402. The biasing force generated by biasing member 1514 determines the magnitude of the clamping force. The internal pressure within reservoir 134 generates a force tending to separate pressure plate 1408 from cover plate 1402. When the internal pressure within reservoir 134 exceeds the clamping force generated by biasing member 1514, pressure plate 1408 will begin to separate from cover plate 1402 by further compressing biasing member 1514, as illustrated in FIG. 16. This results in a gap 1600 forming between pressure plate 1408 and cover plate 1402 (see FIG. 16), which allows pressurized gas 1602, and possibly hydraulic fluid, to escape from reservoir 134. Discharging pressured gas from reservoir 134 produces a corresponding drop in internal pressure within reservoir 134, which in turn causes pressure plate 1408 to be displaced back toward cover plate 1402 in response to the biasing force generated by biasing member 1514. Once the internal pressure drops below the pressure level for activating pressure relief mechanism 1400, the gap between pressure plate 1408 and cover plate 1402 closes to limit further escape of pressurized gas from reservoir 134.

The internal pressure level within reservoir 134 at which pressure relief mechanism 1400 is activated is determined by a preload biasing force generated by biasing member 1514. The "preload biasing force" is the biasing force generated by biasing member 1514 with no internal pressure load on cover pressure plate 1408. The higher the preload biasing force the higher the internal pressure required to activate pressure relief mechanism 1400. The biasing force generated by biasing member 1514 is a function of the amount of compression and the spring rate of the biasing member. Increasing the amount of compression applied to biasing member 1514 produces a corresponding increase in the biasing force generated, which in turn increases the internal pressure level within reservoir 134 required to activate pressure relief mechanism 1400.

Figures 17, 18:
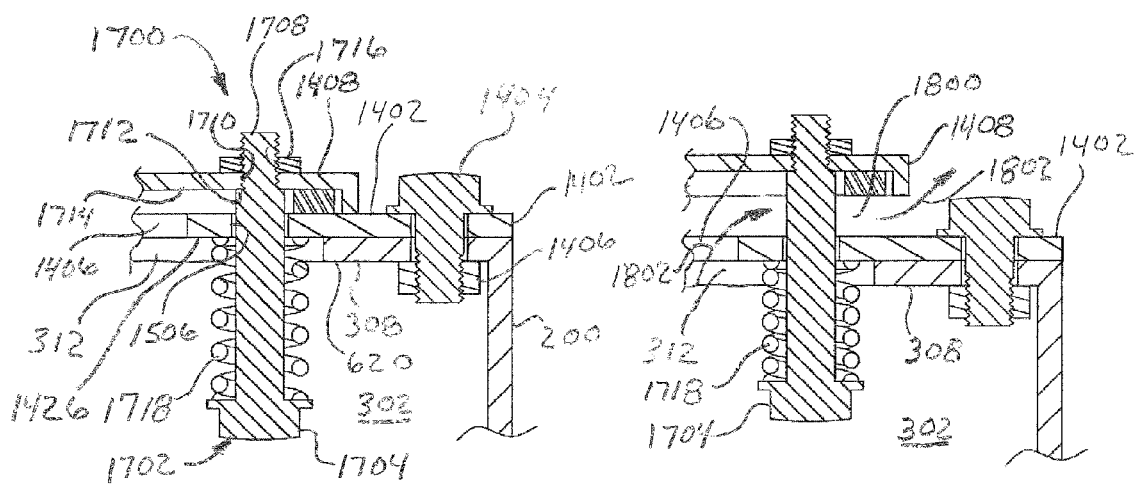
FIG. 17 is a partial cross-sectional view of an alternatively configured pressure responsive fastener employed with the pressure relief mechanism of FIG. 14, with the pressure relief mechanism shown in a deactivated position.
FIG. 18 is a partial cross-sectional view of the pressure responsive fastener of FIG. 17, with the pressure relief mechanism shown in an activated position.

With reference to FIGS. 17 and 18, an exemplary pressure relief mechanism 1700 is illustrated. Pressure relief mechanism 1700 may be configured similar to pressure relief mechanism 1400, as shown in FIGS. 14-16, but employs a pressure responsive fastener 1702 that differs from pressure responsive fastener 1410. Pressure responsive fastener 1702 may include a shoulder bolt 1704 that slidably engages aperture 1506 in cover plate 1402. Shoulder bolt 1704 may be fixedly attached to pressure plate 1408 by threadably engaging an end 1708 with a correspondingly threaded aperture 1710 in pressure plate 1408. A shoulder 1712 of should bolt 1704 engages an underside surface 1714 of pressure plate 1410 when the bolt is fully engaged with threaded aperture 1710. To assist in securing shoulder bolt 1704 to pressure plate 1408, a locknut 1716 may be threadably attached to the exposed threaded end 1708 of the shoulder bolt. Arranged over the shank of shoulder bolt 1704 is a biasing member 1718. One end of biasing member 1718 engages bottom surface 1516 of cover plate 1402, and an opposite end engages the head of shoulder bolt 1704.

Pressure relief mechanism 1700 operates in substantially the same manner as previously described with respect to pressure relief mechanism 1400. Pressure responsive fastener 1700 is configured to enable pressure plate 1408 to separate from cover plate 1402 when the internal pressure within reservoir 134 exceeds a predetermined limit. Pressure plate 1408 is movable between a closed position, as shown in FIG. 17, wherein pressure plate 1408 engages cover plate 1402 to substantially block the fluid path through pressure bleed aperture 1406, and an open position, as shown in FIG. 18, wherein pressure plate 1408 is at least partially disengaged from cover plate 1402, thereby opening the fluid path through bleed aperture 1406. Pressure responsive fastener 1704 generates a clamping force for securing pressure plate 1408 to cover plate 1402. The biasing force generated by biasing member 1718 determines the magnitude of the clamping force. The internal pressure within reservoir 134 generates a force tending to separate pressure plate 1408 from cover plate 1402. When the internal pressure within reservoir 134 exceeds the clamping force generated by biasing member 1718, pressure plate 1408 will begin to separate from cover plate 1402 by further compressing biasing member 1718, as illustrated in FIG. 18. This results in a gap 1800 forming between pressure plate 1408 and cover plate 1402 (see FIG. 16), which allows pressurized gas 1802, and possibly hydraulic fluid, to escape from reservoir 134. Discharging pressurized gas from reservoir 134 produces a corresponding drop in internal pressure within reservoir 134, which in turn causes pressure plate 1408 to be displaced back toward cover plate 1402 in response to the biasing force generated by biasing member 1718. Once the internal pressure drops below the pressure level for activating pressure relief mechanism 1700, the gap between pressure plate 1408 and cover plate 1402 completely closes to limit further escape of pressurized gas from reservoir 134.

With reference to FIGS. 19-22, an exemplary pressure relief mechanism 1900 is shown attached to a cover plate 1902. Cover plate 1902 at least partially covers aperture 312 in flange 308. Although not shown in FIGS. 19 and 22, a gasket may be provided between cover plate 1902 and flange 308 to enhance sealing and minimize leakage of pressurized gas and/or hydraulic fluid through the joint interface.

Cover plate 1902 may be attached to flange 308 using a fastener 1904. For purposes of discussion, fastener 1904 is illustrated in the exemplary configuration as a threaded bolt; however, it shall be appreciated that other attachment devices may also be employed, such as screws and rivets. In the exemplary configuration, fastener 1904 extends through an aperture 2001 in cover plate 1902 and threadably engages a nut 2000 arranged on the underside of flange 308. To facilitate attachment of cover plate 1902 to flange 308, nut 2000 may be suitably attached to bottom surface 620 of flange 308, such as by welding, brazing, soldering, gluing, clips, among others. An aperture 2002 in flange 308 may also be suitably configured to threadably engage fastener 1904, thereby eliminating the need for nut 2000.

Figure 21:
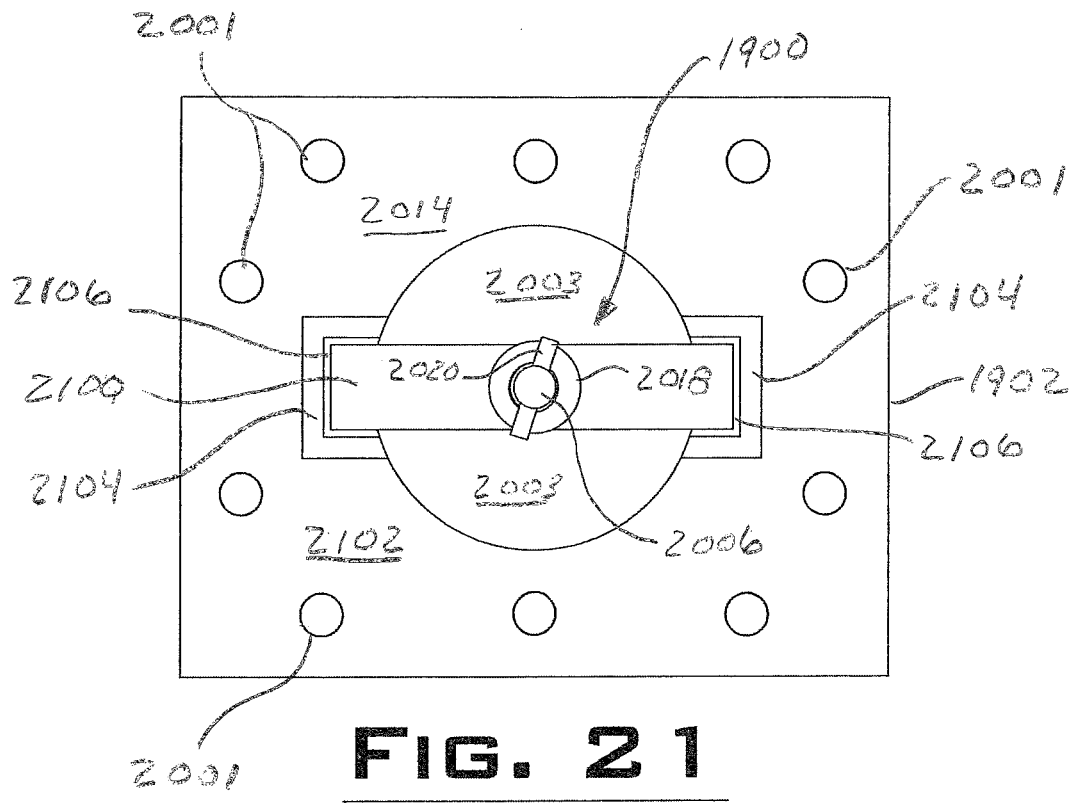
FIG. 21 is a bottom view from inside the reservoir of the pressure relief mechanism of FIG. 19.

Cover plate 1902 includes a pressure bleed aperture 2003 that is in fluid communication with interior cavity 302 of reservoir 134. Pressure bleed aperture 2003 provides a pathway for allowing excess pressure to escape from reservoir 134. Although pressure bleed aperture 2003 is shown in FIG. 21 as having a generally circular shape, the aperture may also have any of a variety of other geometric shapes, including but not limited to, square, rectangular, polygonal, and elliptical, as well as others. Pressure relief mechanism 1900 operates to selectively open and close the fluid path through pressure bleed aperture 2003 in response to the pressure within interior cavity 302 of reservoir 134.

Figure 20:
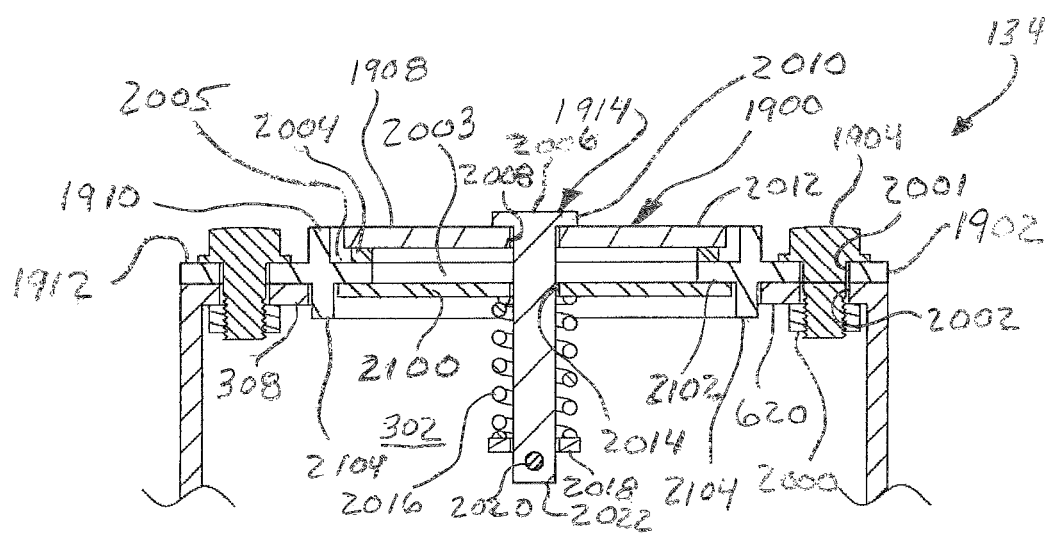
FIG. 20 is partial cross-sectional view of the pressure relief mechanism of FIG. 19, taken along section line 20-20 of FIG. 19, shown in a deactivated position.
Figure 22:
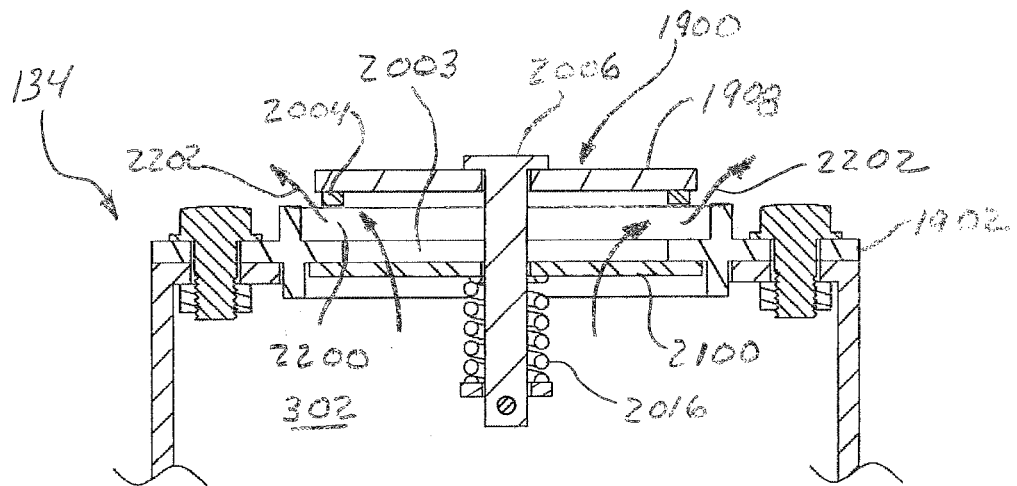
FIG. 22 is a partial cross-sectional view of the pressure relief mechanism of FIG. 19, shown in an activated position.

Pressure relief mechanism 1900 may include a pressure plate 1908 positioned overtop pressure relief aperture 2003. Pressure plate 1908 may be selectively moved into and out of engagement with cover plate 1902 in response to the internal pressure within reservoir 134. Pressure plate 1908 completely covers pressure bleed aperture 2003 when engaged with cover plate 1902. Pressure plate 1908 is movable between a closed position, as shown in FIG. 20, wherein pressure plate 1908 engages cover plate 1902 to substantially block the fluid path through pressure bleed aperture 2003, and an open position, as shown in FIG. 22, wherein pressure plate 1908 is at least partially disengaged from cover plate 1902, thereby opening the fluid path through bleed aperture 2003.

A gasket 2004 may be arranged between pressure plate 1908 and cover plate 1902 to enhance sealing between the two components. Gasket 2004 may extend around the entire periphery of pressure bleed aperture opening 2003 in cover plate 1902. Gasket 2004 may be suitably attached, for example, by means of an adhesive, to either pressure plate 1908 or cover plate 1902. For purposes of discussion, gasket 2004 is shown attached to pressure plate 1908 in FIG. 22.

Figure 19:
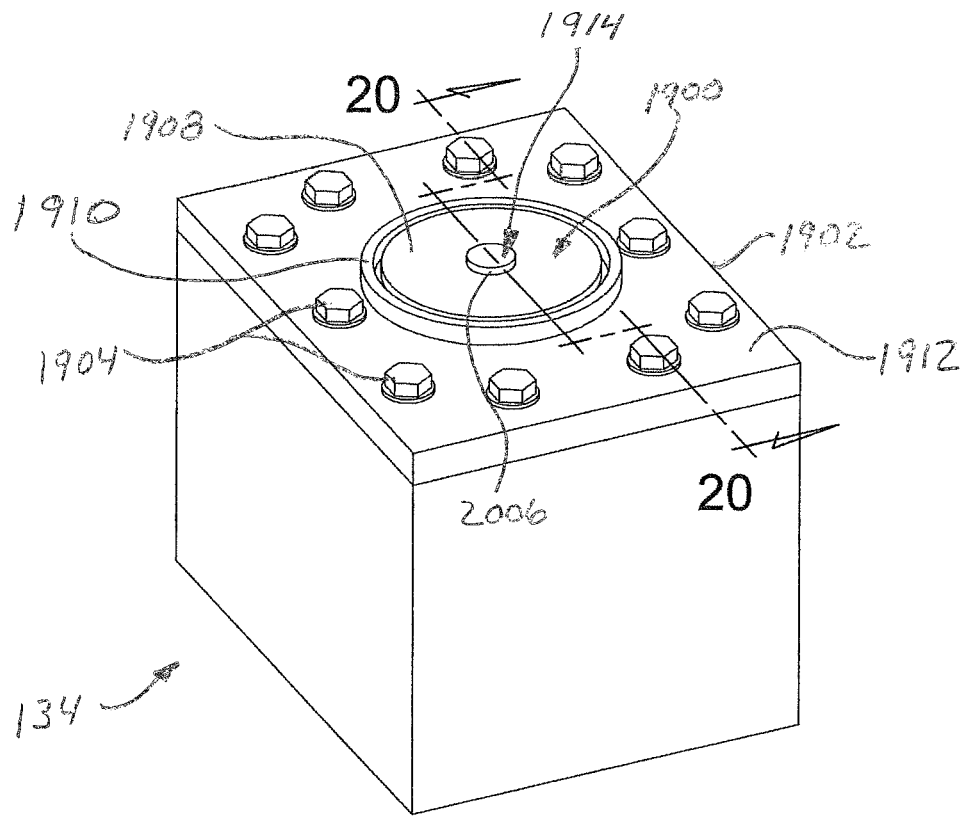
FIG. 19 is a perspective view of the reservoir employing an alternatively configured pressure relief mechanism.

Cover plate 1902 may include a raised circumferential ridge 1910 extending from a top surface 1912 of cover plate 1902. Ridge 1910 may be arranged around an outer periphery of pressure bleed aperture 2003. Ridge 1910 may form a continuous uninterrupted ring, as shown in FIG. 19, or the ring may be discontinuous. Ridge 1910 defines a pocket 2005 for receiving pressure plate 1908. Pocket 2005 helps insure proper positioning of cover plate 1908 relative to pressure bleed aperture 2003.

Pressure relief mechanism 1900 further includes a pressure responsive fastener 1914 for releasably connecting pressure plate 1908 to cover plate 1902. Pressure responsive fastener 1914 may include a pin 2006 that engages an aperture 2008 in pressure plate 1908. A head 2010 of pin 2006 engages a top surface 2012 of pressure plate 1908. Pin 2006 may either slidably or fixedly engage pressure plate 1908.

Positioned below pressure plate 1908 on an opposite side of cover plate 1902 is an elongated cross member 2100. Cross member 2100 spans pressure bleed aperture 2003 and engages a bottom surface 2102 of cover plate 1902. Pin 2006 slidably engages an aperture 2014 in cross member 2100. Cross member 2100 only partially covers pressure bleed aperture 2003, as shown in FIG. 21, to allow pressurized gas to flow past cross member 2100 and through pressure bleed aperture 2003 when pressure relief mechanism 1900 is activated. In the exemplary configuration shown in FIG. 21, cross member 2100 has a width substantially less than the diameter of pressure bleed aperture 2003. This allows pressurized gas to flow past cross member 2100 and through pressure bleed aperture 2003 when pressure relief mechanism 1900 is activated. Pressure plate 1908 and cross member 2100 are arranged on opposite sides of cover plate 1902.

Cover plate 1902 may include one or more raised ridges 2104 extending from bottom surface 2102 of cover plate 1902. Ridges 2104 define pockets 2106 for receiving the ends of cross member 2100. Pockets 2106 help insure proper positioning of cross member 2100 relative to pressure bleed aperture 2003. Raised ridge 2104 may be used in conjunction with or in place of ridge 1910. Raised ridge 2104 may not be necessary if ridge 1910 is employed.

A biasing member 2016 is arranged on a shank of pin 2006, such that one end of biasing member 2016 engages cross member 2100. Also arranged on the shank of pin 2006 is a washer 2018 that engages an end of biasing member 2016 opposite cross member 2100. Biasing member 2016 and washer 2018 may be retained on pin 2006 by a roll pin 2020 that engages an aperture formed in an end 2022 of pin 2006. Other means for retaining biasing member 2016 and washer 2018 to pin 2006 may include, but are not limited to, a cotter pin, screw, rivet, as well as others. Further, end 2022 of pin 2006 may also be threaded to accept a correspondingly threaded nut. Biasing member 2016 is trapped between cross member 2100 and washer 2018.

Pressure relief mechanism 1900 may be assembled to cover plate 1902 by positioning pressure plate 1908 within pocket 2005 of cover plate 1902 so as to cover aperture 2003 in the cover plate. Pin 2006 may then be inserted through aperture 2008 in pressure plate 1908. Alternatively, pin 2006 may be assembled to pressure plate 1908 prior to positioning the pressure plate within pocket 2005. Cross member 2100 may then be slid onto the shank of pin 2006 and positioned within pockets 2106 on the bottom of cover plate 1902, thereby trapping cover plate 1902 between pressure plate 1908 and cross member 2100. Biasing member 2016 and washer 2018 may then be slid sequentially onto the shank of pin 2006. The components may be retained on pin 2006 by inserting roll pin 2020 into the corresponding aperture in end 2022 of pin 2006. The entire assembly may then be attached to flange 308 of reservoir tank 200 using fastener 1904.

Pressure responsive fastener 1914 is configured to enable pressure plate 1908 to separate from cover plate 1902 when the internal pressure within reservoir 134 exceeds a predetermined limit. Pressure responsive fastener 1914 generates a clamping force for securing pressure plate 1908 to cover plate 1902. The biasing force generated by biasing member 2016 determines the magnitude of the clamping force. The internal pressure within reservoir 134 generates a force tending to separate pressure plate 1908 from cover plate 1902. When the internal pressure within reservoir 134 exceeds the clamping force generated by biasing member 2016, pressure plate 1908 will begin to separate from cover plate 1902 by further compressing biasing member 2016, as illustrated in FIG. 22. This results in a gap 2200 forming between pressure plate 1908 and cover plate 1902 (see FIG. 22), which allows pressurized gas 2202, and possibly hydraulic fluid, to escape from reservoir 134. Discharging pressured gas from reservoir 134 produces a corresponding drop in internal pressure within reservoir 134, which in turn causes pressure plate 1908 to be displaced back toward cover plate 1902 in response to the biasing force generated by biasing member 2016. Once the internal pressure drops below the pressure level for activating pressure relief mechanism 1900, the gap between pressure plate 1908 and cover plate 1902 closes to limit further escape of pressurized gas from reservoir 134.

The internal pressure level within reservoir 134 at which pressure relief mechanism 1900 is activated is determined by a preload biasing force generated by biasing member 2016. The "preload biasing force" is the biasing force generated by biasing member 2016 with no internal pressure load on cover pressure plate 1908. The higher the preload biasing force the higher the internal pressure required to activate pressure relief mechanism 1900. The biasing force generated by biasing member 2016 is a function of the amount of compression and the spring rate of the biasing member. Increasing the amount of compression applied to biasing member 2016 produces a corresponding increase in the biasing force generated, which in turn increases the internal pressure level within reservoir 134 required to activate pressure relief mechanism 1900.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously or generally simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A hydraulic reservoir comprising:
   a reservoir tank having an interior cavity for retaining a fluid and an aperture fluidly connecting the interior cavity to an exterior region of the reservoir and a flange formed on the reservoir tank around the aperture;
   a cover selectively engagable with the reservoir tank, the cover movable between an open position, wherein the fluid path through the aperture in the reservoir tank is at least partially open, and a closed position, wherein the fluid path through the aperture is substantially closed;
   a seal disposed between the cover and the flange;
   a pressure relief mechanism including at least one pressure responsive fastener releasably connecting the cover to the reservoir tank, the at least one pressure responsive fastener including a fastener fixed for concurrent movement with one of the cover and the reservoir tank, and a biasing member operably connecting the fastener to whichever of the cover and reservoir tank is not fixed for concurrent movement with the fastener, wherein the pressure responsive fastener operates between the cover and the flange so as to apply a clamping force on the seal until an internal pressure in the reservoir tank exceeds a specified level; and
   a retaining cup fixedly attached to the reservoir tank, the biasing member disposed within the retaining cup; and
   a fastening element associated with the retaining cup, the retaining cup configured to prevent movement of the fastening element when the fastener and the fastening element engage.

2. The hydraulic reservoir of claim 1, wherein the fastener is fixed for concurrent movement with the cover and the biasing member has one end fixed relative to the reservoir and an opposite end fixed for concurrent movement with the fastener.

3. The hydraulic reservoir of claim 1, wherein the fastener includes a head and a threaded end opposite the head, the threaded end engaging a threaded member, the biasing member disposed between the head and the threaded member, wherein the biasing force generated by the biasing member is adjustable by selectively varying a distance between the fastener head and the threaded member.

4. A hydraulic reservoir comprising:
   a reservoir tank having an interior cavity for retaining a fluid and an aperture fluidly connecting the interior cavity to an exterior region of the reservoir;
   a flange attached to the reservoir tank at the aperture;
   a cover selectively engagable with the reservoir tank, the cover movable between an open position wherein the fluid path through the aperture in the reservoir tank is at least partially open, and a closed position, wherein the fluid path through the aperture is substantially closed; and
   a pressure relief mechanism including at least one pressure responsive fastener releasably connecting the cover to the reservoir tank, the fastener being fixed for concurrent movement with one of the cover and the reservoir tank, and a biasing member operably connecting the fastener to whichever of the cover and reservoir tank is not fixed for concurrent movement with the fastener;
   wherein the fastener is positioned to contact the underside of the flange.

5. The hydraulic reservoir of claim 4, wherein the fastener is fixed for concurrent movement with the cover and the biasing member has one end fixed relative to the reservoir and an opposite end fixed for concurrent movement with the fastener.

6. The hydraulic reservoir of claim 5, wherein the fastener includes a head and a threaded end opposite the head, the threaded end engaging a threaded member, the biasing member disposed between the head and the threaded member, wherein the biasing force generated by the biasing member is adjustable by selectively varying a distance between the fastener head and the threaded member.

7. The hydraulic reservoir of claim 4, wherein the fastener and the biasing member are disposed within the interior cavity of the reservoir tank.

8. The hydraulic reservoir of claim 4, further comprising a seal disposed between the cover and the flange.

* * * * *